United States Patent Office 3,493,130
Patented Feb. 3, 1970

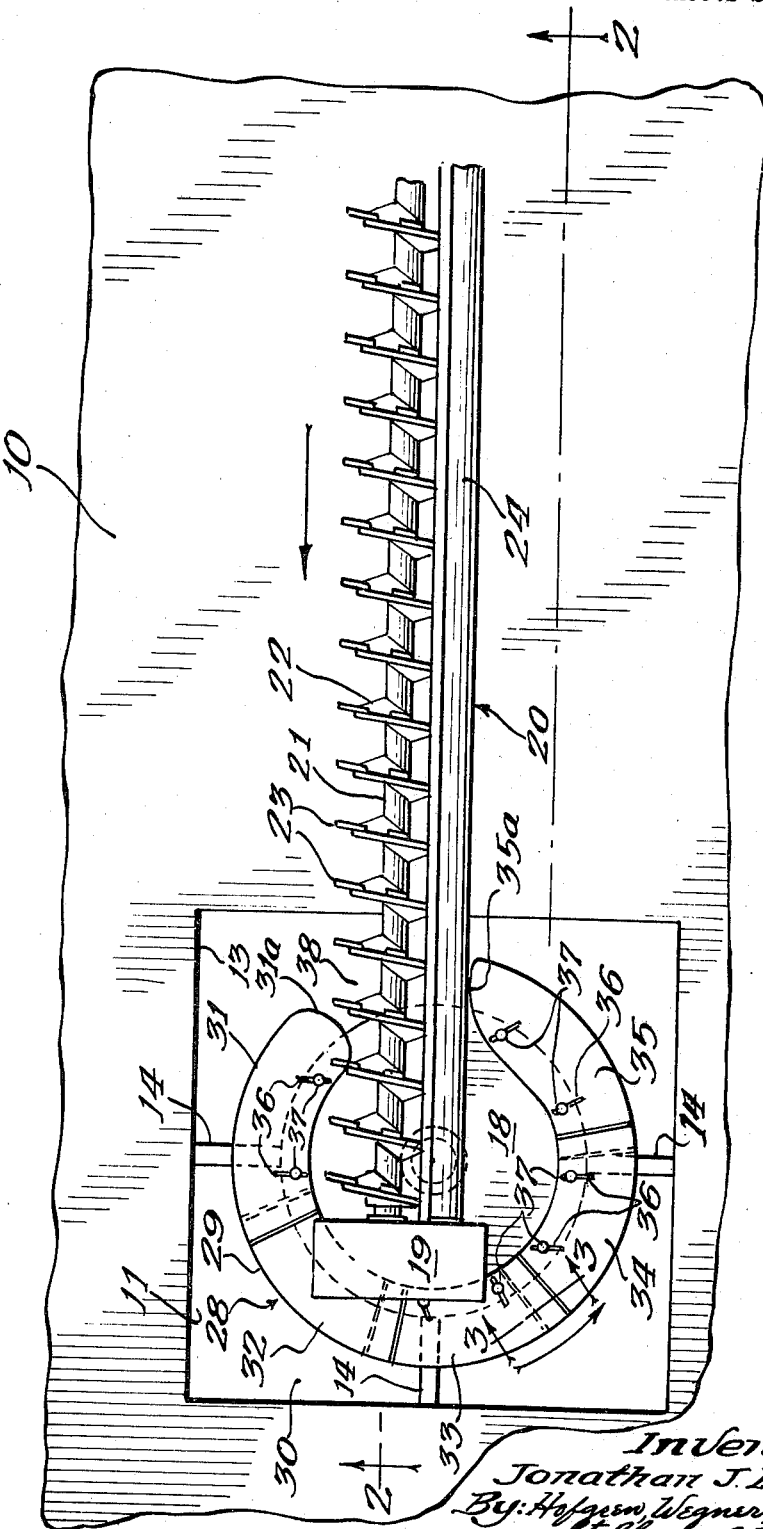

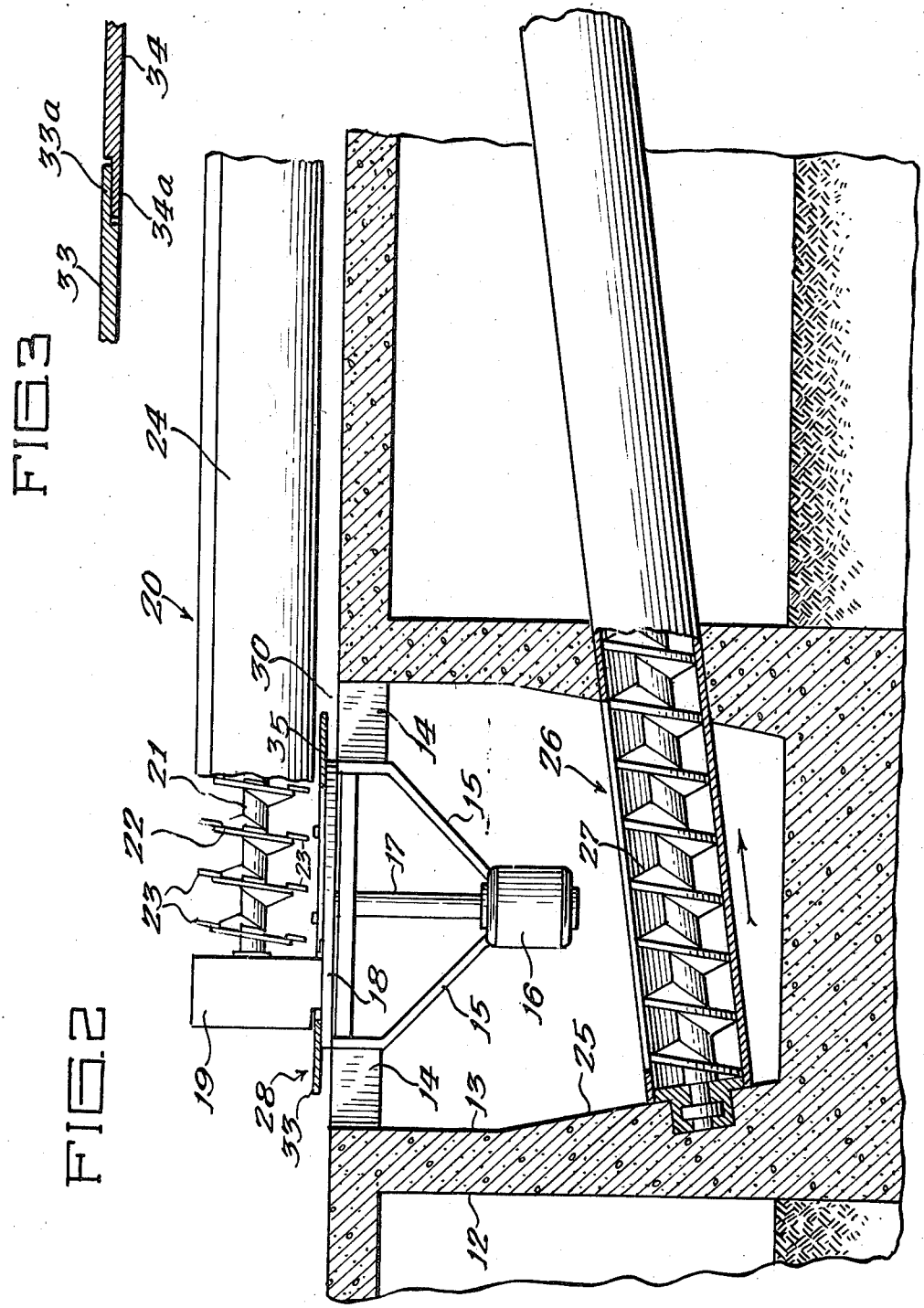

3,493,130
BOTTOM SILO UNLOADERS
Jonathan J. Laidig, Mishawaka, Ind., assignor to Laidig Silo Unloaders, Inc., a corporation of Delaware
Filed Sept. 22, 1967, Ser. No. 669,775
Int. Cl. B65g *65/30;* B65d *47/00*
U.S. Cl. 214—17                                6 Claims

ABSTRACT OF THE DISCLOSURE

A bottom silo unloader of the type in which a sweep arm provided with cutter-conveyor means rotates about the vertical axis of the silo to cut material and feed it through a central hopper-like outlet in the silo floor to a discharge conveyor which carries it out of the silo, characterized by a baffle in the center of said opening which cooperates with the top edge of the outlet wall to provide a generally annular opening of a small enough radial width that large falls of material which is not free flowing may bridge across the opening where they may be cut up by the cutter-conveyor, instead of clogging the hopper or discharge conveyor.

Background of the invention

The present invention constitutes an improvement upon the basic structure disclosed in Laidig Reissue Patent 25,863, issued Sept. 21, 1965 as a reissue of Patent 3,121,501 which issued Feb. 18, 1964.

Bottom silo unloaders which feed material through an opening in the center of the silo floor commonly have a generally frusto-conical hopper-like outlet through which material enters an auger or other type of discharge conveyor beneath the silo floor which carries from the silo the material that is fed to the central opening by a cutter-conveyor in the bottom of the silo. Material stored in the silo is often of a type which is not free-flowing, so that it may form an arch, or dome by the interlocking of pieces of the material. As the cutter-conveyor in the bottom of the silo is rotated about the vertical axis of the silo on a sweep arm it cuts and conveys material from the bottom of the mass in the silo and feeds it into the central opening. Gradually an arch, or dome is formed which is supported principally by a relatively thin layer of material near the silo wall; and as that layer breaks down from the pressure of material above it, the entire mass may slide down, or parts of it may slide down ahead of other parts. The shifting stresses in the lower part of the material in the silo may cause large masses of material to break loose and drop into the outlet opening in large enough quantities to clog the outlet or overload the discharge conveyor and thus prevent or delay the discharge of material from the silo.

Accordingly, a constant problem with silo unloaders of the present type is that large falls of material from the bottom of the mass in the silo may periodically drop into the central hopper-type outlet and choke the outlet or the discharge conveyor.

On the other hand, free-flowing material which cannot choke the outlet or the discharge conveyor may feed freely into the outlet and the conveyor.

Summary of the invention

The principal object of the present invention is to provide an improved bottom unloader for silos in which choking of the outlet or overloading of the discharge conveyor beneath the floor is eliminated by positioning a baffle structure in the top of the central outlet which prevents large masses of non-free-flowing material from falling into the outlet.

More particularly, a rotatable central plate upon which the inner end of the cutter-conveyor sweep arm is positioned, and which rotates upon the vertical axis of the silo as the sweep arm traverses the circumference of the structure, is provided with a plurality of radially extending baffle plates the outer margins of which cooperate with the upper edge of the central outlet to provide a generally annular discharge opening having a sufficiently small radial dimension that if a large mass of non-free-flowing material drops from the mass in the silo it can bridge across the top of the discharge opening at floor level, rather than falling into the outlet and choking the outlet or the discharge conveyor. In this position the cutter-conveyor may cut up the mass and feed it into the outlet in manageable quantities.

The baffle means comprises a plurality of arcuate plates which are mounted upon the rotatable central support for the sweep arm effectively at floor level, and each plate is mounted for radial adjustment or removal so that the radial extent of the discharge opening may be varied or adjusted depending upon the material in the silo.

Furthermore, the baffle means does not extend around the entire circumference of the rotatable support, but instead has a gap beneath the leading portion of the cutter-conveyor means so that the radial extent of the discharge opening where material is fed to it by the cutter-conveyor means is substantially greater than at any other part of the central opening.

The baffle is so constructed that the leading end portion of each segment overlies the trailing end portion of the segment which precedes it, in the direction of rotation of the sweep arm and baffle means.

Description of the drawings

The invention is illustrated in a preferred embodiment in the accompanying drawings in which:

FIG. 1 is a fragmentary plan view of the floor of a silo which is equipped with a silo unloader constructed in accordance with the present invention;

FIG. 2 is a transverse sectional view taken substantially as indicated along the line 2—2 of FIG. 1; and FIG. 3 is a fragmentary sectional view on an enlarged scale taken substantially as indicated along the line 3—3 of FIG. 1.

Detailed description

Referring to the drawings in greater detail, a silo is provided with a floor 10 in which there is a central outlet opening 11 defined by a continuous wall 12 having a continuous inner surface 13. Radial webs 14 and brackets 15 support a motor 16 which has an upwardly extending shaft 17 on the vertical axis of the silo, and a plate 18 is supported for rotation upon the upper ends of the brackets 15. Supported on the plate 18 is a gear box 19 which is driven by the motor; and a sweep arm, indicated generally at 20 is provided with cutter-conveyor means in the form of a shaft 21 driven from the gear box 19, an auger flight 22 on the shaft, and cutting blades 23 which project from the periphery of the auger flight. The sweep arm includes a shield 24 which trails the auger conveyor as the sweep arm rotates.

The central opening 11 has a tapering hopper-like lower outlet portion 25 which directs material into a discharge conveyor, indicated generally at 26, that includes auger means 27 for discharging material from the silo.

The foregoing components are all known in the prior art, and for practical purposes are the same as those disclosed in Laidig Reissue Patent 25,863.

In accordance with the present invention, the central opening 11 is of predetermined dimensions, and the rotatable support 18 is provided with baffle means, indicated generally at 28, which is effectively coplanar with the floor 10 and has an outer margin 29 that cooperates with the continuous surface 13 to provide a generally annular discharge opening 30. The baffle means 28 consists of a plurality of arcuate plates 31, 32, 33, 34 and 35; and as shown by reference to the plate 31 in FIG. 1 each of the plates has a pair of parallel, generally radially extending slots 36 which impale studs 37 on the rotatable plate 18 in order that each of the baffle plates 31 to 35, inclusive, may be radially adjusted to vary the radial extent of the discharge opening 30. When desired the plates may be removed to provide optimum conditions for handling certain types of material.

For smooth and trouble-free operation of the device, each of the plates is seen in FIG. 3 to have a leading edge portion 33a which overlies a trailing edge portion 35a of the next preceding baffle plate. Thus, the baffle plates are seen to slide freely over any irregularities in the supporting structure.

Finally, the baffle plate 31, which is immediately ahead of the sweep arm as determined by its direction of rotation, has a generally radially extending margin 31a, and the baffle plate 35 has a generally radially extending margin 35a which cooperates with the margin 31a to provide a gap 38 beneath the leading portion of the cutter-conveyor means. Thus, material cut and conveyed by the cutter-conveyor means may drop through the relatively large space afforded by the gap 38, while the relatively narrow and generally annular discharge opening 30 prevents excessive falls of material from entering the hopper-like outlet 25 where it may clog the outlet or the discharge conveyor means 26 by falling directly from the stored mass of material in the silo through the discharge opening.

In a specific commercial embodiment of the invention, the central opening 11 is 42 inches on each side, the central rotatable plate 18 is 24 inches in diameter, and the baffle plates 31 to 35, inclusive, project 6 inches radially outwardly from the periphery of the plate 18 so that the smallest dimension of the discharge opening 30 is only 3 inches and the maximum dimension to a corner of the central opening 11 is approximately a foot. The baffle plates may be adjusted sufficiently to provide a substantial difference in the width of the opening; and by removing one or more of them the size of the opening may be greatly increased.

The foregoing detailed description is given for clearness of understanding only, and no unnecessary limitations should be understood therefrom, as modifications will be obvious to those skilled in the art.

I claim:

1. In a bottom silo unloader of the type which has a sweep arm that rotates about the vertical axis of the silo and has cutter-conveyor means to cut and move material into a central opening in the silo floor which is the top of a tapered hopper-like outlet, and in which there is discharge conveyor means beneath the floor to receive said material through the hopper-like outlet and discharge it at the side of the silo, the improvement comprising: a central opening of predetermined area and having its perimeter defined by a continuous surface; and baffle means generally in the center of said opening and effectively at floor level so as to create a generally annular discharge opening between said baffle means and said surface, said baffle means comprising a plurality of arcuate segments and means for adjusting each of said segments radially to vary the width of the discharge opening, the distance from the outer edge of said baffle means to said perimeter being less than the distance across which a mass of non-free-flowing material in the silo may form an unsupported bridge, whereby fallen masses of non-free-flowing material in the central area of the silo may bridge across said discharge opening so that they enter the hopper-like outlet only as they are cut up by the cutter-conveyor means.

2. The improvement of claim 1 in which the baffle means rotates with the sweep arm, and there is a gap in the baffle means beneath the leading portion of the cutter-conveyor means.

3. The improvement of claim 1 in which the baffle means are separately removable.

4. In a bottom silo unloader of the type which has a sweep arm that rotates about the vertical axis of the silo and has cutter-conveyor means to cut and move material into a central opening in the silo floor which is the top of a tapered hopper-like outlet, and in which there is discharge conveyor means beneath the floor to receive said material through the hopper-like outlet and discharge it at the side of the silo, the improvement comprising: a central opening of predetermined area and having its perimeter defined by a continuous surface; and baffle means generally in the center of said opening and effectively at floor level so as to create annular discharge opening between said baffle means and said surface, said baffle means rotating with the sweep arm and comprising a plurality of arcuate segments with the leading end portion of each segment overlying the trailing end portion of the segment which precedes it in the direction of rotation of the sweep arm, the distance from the outer edge of said baffle means to said perimeter being less than the distance across which a mass of non-free-flowing material in the silo may form an unsupported bridge, whereby fallen masses of non-free-flowing material in the central area of the silo may bridge across said discharge opening so that they enter the hopper-like outlet only as they are cut up by the cutter-conveyor means.

5. The improvement of claim 4 in which means are provided for adjusting each of said segments radially to vary the width of the discharge opening.

6. The improvement of claim 4 in which there is a gap in the baffle means beneath the leading portion of the cutter-conveyor means.

References Cited

UNITED STATES PATENTS

| | | |
|---|---|---|
| 2,764,320 | 9/1956 | Broberg et al. |
| 3,237,788 | 3/1966 | Weaver et al. |
| 3,391,809 | 7/1968 | Weaver et al. |

ROBERT G. SHERIDAN, Primary Examiner

U.S. Cl. X.R.

222—502